US011914632B2

(12) United States Patent
Tommasi et al.

(10) Patent No.: US 11,914,632 B2
(45) Date of Patent: Feb. 27, 2024

(54) INTELLIGENT MEDIA DATA EXPLORER

(71) Applicant: INTERNATIONAL BUSINESS MACHINES CORPORATION, Armonk, NY (US)

(72) Inventors: Pierpaolo Tommasi, Dublin (IE); Marco Luca Sbodio, Castaheany (IE); Yufang Hou, Dublin (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/659,626

(22) Filed: Apr. 18, 2022

(65) Prior Publication Data

US 2023/0334081 A1 Oct. 19, 2023

(51) Int. Cl.
*G06F 16/435* (2019.01)
*G06F 16/45* (2019.01)

(52) U.S. Cl.
CPC ........... *G06F 16/435* (2019.01); *G06F 16/45* (2019.01)

(58) Field of Classification Search
CPC .............................. G06F 16/435; G06F 16/45
USPC ......................................................... 707/738
See application file for complete search history.

(56) References Cited

U.S. PATENT DOCUMENTS

| | | | |
|---|---|---|---|
| 8,295,462 B2 | 10/2012 | Miller et al. | |
| 8,386,519 B2 * | 2/2013 | Kenedy | G06F 16/951 707/784 |
| 8,666,749 B1 * | 3/2014 | Subramanya | G06F 16/683 704/277 |
| 8,849,958 B2 | 9/2014 | Liebald et al. | |
| 10,044,872 B2 | 8/2018 | Guo et al. | |
| 10,642,889 B2 | 5/2020 | Reshef et al. | |
| 10,878,505 B1 * | 12/2020 | Blair | G06F 18/24 |
| 11,276,434 B1 * | 3/2022 | Robert Jose | H04N 21/8405 |
| 2015/0172787 A1 * | 6/2015 | Geramifard | H04N 21/252 725/40 |
| 2017/0199934 A1 | 7/2017 | Nongpiur et al. | |
| 2019/0130185 A1 * | 5/2019 | Delaney | G06V 20/62 |
| 2020/0396464 A1 * | 12/2020 | Shah | H04N 19/115 |

OTHER PUBLICATIONS

Schremmer et al., "Meta Data Extraction from Linguistic Meeting Transcripts for the Annodex File Format", Proceedings of the 11th International Multimedia Modeling Conference, pp. 405-412, IEEE Computer Society, published Jun. 7, 2004 (8 pages).
Zhi et al., "VisPod: Content-Based Audio Visual Navigation", Proceedings of the 23rd International Conference on Intelligent User Interfaces, IUI 2018, Association for Computing Machinery, New York, NY, USA, Article No. 10, pp. 1-2, published Mar. 2018 (2 pages).

(Continued)

*Primary Examiner* — Kimberly L Wilson
(74) *Attorney, Agent, or Firm* — Robert R. Aragona

(57) ABSTRACT

Embodiments for providing an intelligent media data service in a computing environment by a processor. One or more sections of media data are identified and annotated (e.g., tagged) for a user based on a degree of relevancy between a user profile and the media data, wherein the media data include media classification, topic detection, speaker detection and noise detection. The one or more sections of media data are selected for the user based on the tagging of the or more sections.

20 Claims, 7 Drawing Sheets

(56) References Cited

OTHER PUBLICATIONS

Kawahara, Tatsuya, "Spoken Language Processing for Audio Archives of Lectures and Panel Discussions", Proceedings of the International Conference on Informatics Research for Development of Knowledge Society Infrastructure, ICKS 2004, pp. 23-30, DOI: 10.1109/ICKS.2004.1313405, published Dec. 29, 2004 (9 pages).
Mirrezaei et al., "Robust Speaker Diarization in a Multi-Speaker Environment Using Autocorrelation-based Noise Subtraction", Proceedings of the 2007 IEEE International Symposium on Signal Processing and Information Technology, pp. 291-296. IEEE, DOI: 10.1109/ISSPIT.2007.4458171, published Dec. 2007 (7 pages).
Hori et al. , "Real-Time Meeting Recognition and Understanding Using Distant Microphones and Omni-Directional Camera", Proceedings of the 2010 IEEE Workshop on Spoken Language Technology, SLT 2010, DOI: 10.1109/SLT.2010.5700890, published Dec. 2010 (6 pages).
Kumar et al., "Few-Shot Learning of an Interleaved Text Summarization Model by Pretraining with Synthetic Data", arXiv:2103.05131v1, [v1] published Mon, Mar. 8, 2021.
Kawahara et al., "Automatic Indexing of Lecture Presentations Using Unsupervised Learning of Presumed Discourse Markers," IEEE Trans. on Speech and Audio Processing, vol. 12, No. 4, pp. 409-419, doi: 10.1109/TSA.2004.828701, published Jul. 2004 (13 pages).
Assfalg et al.. "Feature Extraction and Content Analysis for Sports Videos Annotation", Proceedings of the 2001 ACM workshops on Multimedia: multimedia information retrieval (MULTIMEDIA '01). ACM, ,pp. 60-65, published Sep. 2001 (6 pages).
Oliveira et al., "Image Processing Techniques for Video Content Extraction", In Proceedings of 4th Dellos Workshop published 1997 (10 pages).
Bouaziz et al., "AViTExt: Automatic Video Text Extraction, A new Approach for video content indexing Application", 3rd International Conference on Information and Communication Technologies: From Theory to Application (ICTTA 2008), arXiv:1301.2173, published Jan. 2013 (5 pages).

* cited by examiner

US 11,914,632 B2

INTELLIGENT MEDIA DATA EXPLORER

BACKGROUND

The present invention relates in general to computing systems, and more particularly, to various embodiments for providing an intelligent media data service in a computing environment using a computing processor.

SUMMARY

According to an embodiment of the present invention, a method for providing an intelligent media data service (e.g., a smart audio recording explorer) in a computing environment, by one or more processors, is depicted. One or more sections of media data are identified and annotated (e.g., tagged) for a user based on a degree of relevancy between a user profile and the media data, wherein the media data include media classification, topic detection, speaker detection and noise detection. The one or more sections of media data are selected for the user based on the tagging of the or more sections.

An embodiment includes a computer usable program product. The computer usable program product includes a computer-readable storage device, and program instructions stored on the storage device.

An embodiment includes a computer system. The computer system includes a processor, a computer-readable memory, and a computer-readable storage device, and program instructions stored on the storage device for execution by the processor via the memory.

Thus, in addition to the foregoing exemplary method embodiments, other exemplary system and computer product embodiments are provided.

DETAILED DESCRIPTION OF THE DRAWINGS

Figure 1:
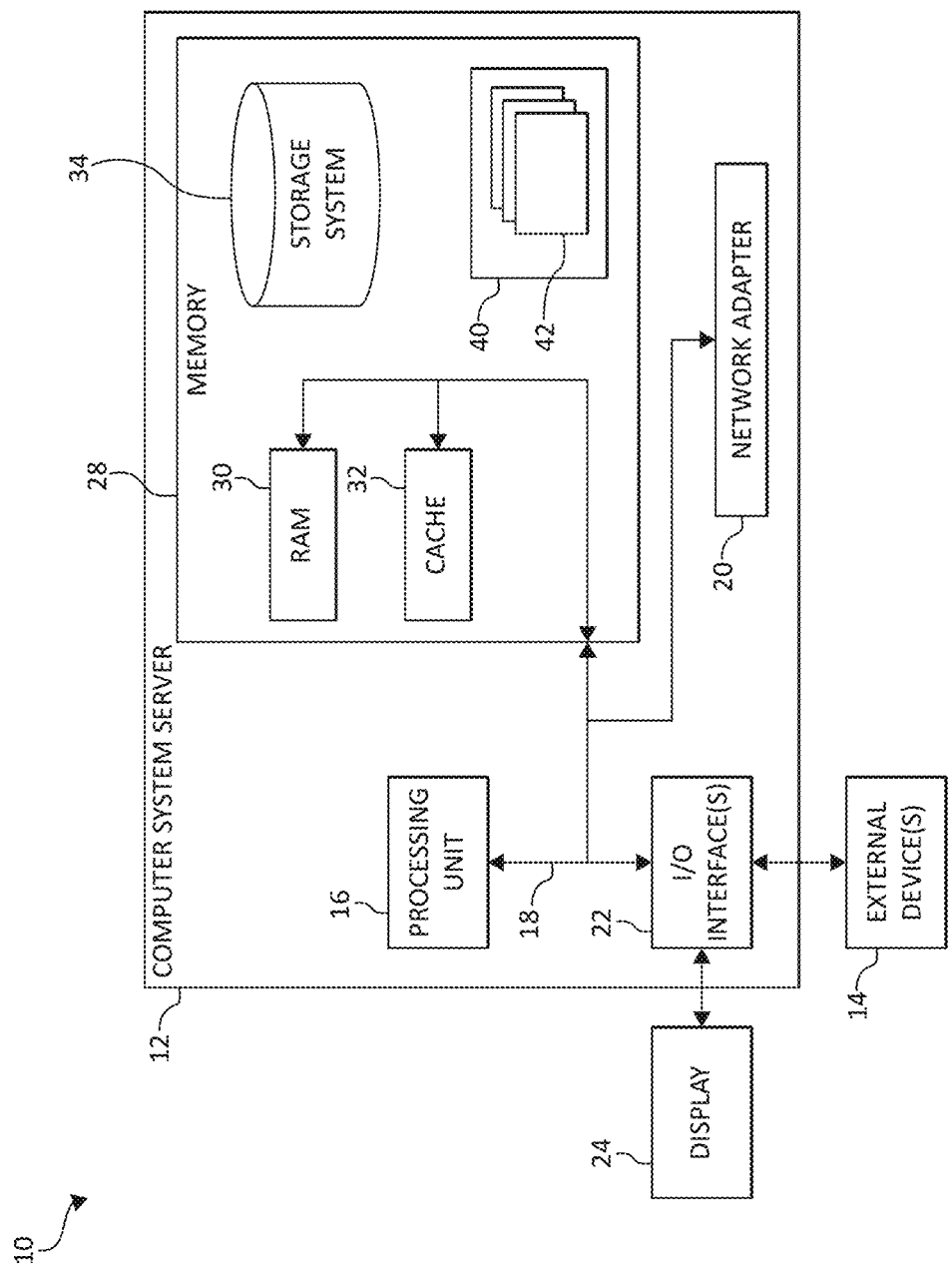
FIG. 1 is a block diagram depicting an exemplary cloud computing node according to an embodiment of the present invention.

As a preliminary matter, computing systems may include large scale computing called "cloud computing," in which resources may interact and/or be accessed via a communications system, such as a computer network. Resources may be software-rendered simulations and/or emulations of computing devices, storage devices, applications, and/or other computer-related devices and/or services run on one or more computing devices, such as a server. For example, a plurality of servers may communicate and/or share information that may expand and/or contract across servers depending on an amount of processing power, storage space, and/or other computing resources needed to accomplish requested tasks. The word "cloud" alludes to the cloud-shaped appearance of a diagram of interconnectivity between computing devices, computer networks, and/or other computer related devices that interact in such an arrangement.

Additionally, the Internet of Things (IoT) is an emerging concept of computing devices that may be embedded in objects, especially appliances, and connected through a network. An IoT network may include one or more IoT devices or "smart devices", which are physical objects such as appliances with computing devices embedded therein. Many of these objects are devices that are independently operable, but they may also be paired with a control system or alternatively a distributed control system such as one running over a cloud computing environment.

With the increased uses of various types of computing devices (aka "user equipment") such as, for example, wireless communication devices (e.g., IoT devices, smartphones, tablets, computers), each of these computing devices may enhance and improve various aspects of a user's daily activities and interest. However, a need exits for an intelligent media service that automatically enable music players and/or streaming service to users to focus directly on what is most relevant to them, skipping irrelevant parts without having to manually skip content without taking user preferences. That is, the present invention may provide for detecting the segmentation of music while also detecting the segmentation of video meeting records such as, for example, enabling a user listening to music to automatically skip or fast forward portions of the music (e.g., skip a segment of music to a desired, relevant music section).

In some implementations, the present invention provides for the identification of media sections (e.g., sections of an audio recording). The identification of media sections may include, for example, identifying a classification, topic detection, speaker detection and noise detection. In some implementations, various parts of video may be used during a labelling phase (e.g., a user may share some content (slides, documents, etc.), and video frames may be used where a user is sharing to refine identification of sections). Each section may belong to multiple classes (e.g., a classification), and have multiple topics and multiple speakers. Media data sections may also overlap from a temporal point of view. In some implementations, the present invention provides a user interface, or enables a user interface, that allows the user to explore the audio recording in a multi-faceted way by selecting one or more speaker and/or topics of interest or preference for a user.

In some implementations, the present invention automatically identifies sections that are interesting or enjoyment for the current user based on the user profile, metadata, other users, and highlighting those sections in the user interface. In some implementations, the present invention collects feedback from the user to adjust, modify, and/or edit the identified sections and improve the accuracy of the method.

To further illustrate, consider the following example. Assume John Doe is onboarding on an existing project and is required to watch and listen to twelve ("12") audio records about the topic to catch up with the other colleagues, each one hour long. In one aspect, without mechanisms of the illustrated embodiments, the user would have to screen all the video, searching for the most relevant part, risking leaving important information behind if skipping sections of the videos. In some implementations, the present invention assists John Doe focus on what's most important, going directly to the identified, relevant content and bypassing/skipping the rest of the non-relevant, less important audio. As John Doe watches more content, the present invention may learn both what is more relevant to him and improves the quality of the annotations (e.g., the topic, the speaker, the noise detection, etc. . . . ).

In another example, assume Jane Doe missed a day long webinar about hybrid cloud computing, and Jane Doe really wants to be updated on what she missed. Assume the recordings is turned on to record the audio data. Without the present invention, Jane Doe would not be able to focus on the sessions she is most interested into, unless someone manually added chapters to the videos, simplifying the exploration of the recorded material. Otherwise, she has to screen the content, or risk missing interesting parts. The present invention provides a list of speakers and topics, already customized for Jane Doe's profile. Jane Doe would be able to see on the timeline the audio sections, which are relevant to Jane Doe, without spending time in browsing the content.

Accordingly, various embodiments are provided herein for providing an intelligent media data service (e.g., a smart audio recording explorer) in a computing environment. One or more sections of media data are identified and annotated (e.g., tagged) for a user based on a degree of relevancy between a user profile and the media data, wherein the media data include media classification, topic detection, speaker detection and noise detection. The one or more sections of media data are selected for the user based on the tagging of the or more sections.

That is, the present invention may automatically tag portions of an audio stream (e.g., categorize the audio stream, detect one or more speakers and topics) and pick/select the most relevant portions of the media data (e.g., an audio recording or audio data that is being stream) for the current user. This effectively reduces the time required by a user to listen to what is most important to the user. The present invention automatically bypasses and skips those portion of the media data that are not relevant portion of the audio (e.g., noise, out of interest topic) enabling the user to focus on the part most relevant to the user.

In other implementations, a machine learning model may include a knowledge domain that may be used and may include an ontology of concepts representing a domain of knowledge such as, for example, a knowledge domain of music, songs, categories, topics, etc. A thesaurus or ontology may be used as the domain knowledge and may also be used to associate various characteristics, parameters, values, attributes, symptoms, behaviors, sensitivities, parameters, user profiles, computing device profiles, environmental, topology, geography and climate profiles, relationships and/or computing devices. In one aspect, the term "domain" is a term intended to have its ordinary meaning. In addition, the term "domain" may include an area of expertise for a system or a collection of materials, information, content and/or other resources related to a particular subject or subjects.

The term ontology is also a term intended to have its ordinary meaning. In one aspect, the term ontology in its broadest sense may include anything that can be modeled as ontology, including but not limited to, taxonomies, thesauri, vocabularies, and the like. For example, an ontology may include information or content relevant to a domain of interest or content of a particular class or concept. The ontology can be continuously updated with the information synchronized with the sources, adding information from the sources to the ontology as models, attributes of models, or associations between models within the ontology.

It should be noted as described herein, the term "intelligent" (or "cognition") may be relating to, being, or involving conscious intellectual activity such as, for example, thinking, reasoning, or remembering, that may be performed using a machine learning. In an additional aspect, intelligent or "intelligence" may be the mental process of knowing, including aspects such as awareness, perception, reasoning and judgment. A machine learning system may use artificial reasoning to interpret data from one or more data sources (e.g., sensor-based devices or other computing systems) and learn topics, concepts, judgment reasoning knowledge, and/or processes that may be determined and/or derived by machine learning.

In general, as used herein, "optimize" (or "enhanced") may refer to and/or defined as "maximize," "minimize," "most likely," "best," or attain one or more specific targets, objectives, goals, or intentions. Optimize may also refer to maximizing a benefit to a user (e.g., maximize a trained machine learning pipeline/model benefit). Optimize may also refer to making the most effective or functional use of a situation, opportunity, or resource.

Additionally, optimizing need not refer to a best solution or result but may refer to a solution or result that "is good enough" or "most likely" for a particular application, for example. In some implementations, an objective is to suggest a "best" combination of preprocessing operations ("preprocessors") and/or machine learning models/machine learning pipelines, but there may be a variety of factors that may result in alternate suggestion of a combination of preprocessing operations ("preprocessors") and/or machine learning models yielding better results. Herein, the term "optimize" may refer to such results based on minima (or maxima, depending on what parameters are considered in the optimization problem). In an additional aspect, the terms "optimize" and/or "optimizing" may refer to an operation performed in order to achieve an improved result such as reduced execution costs or increased resource utilization, whether or not the optimum result is actually achieved. Similarly, the term "optimize" may refer to a component for performing such an improvement operation, and the term "optimized" may be used to describe the result of such an improvement operation.

It is understood in advance that although this disclosure includes a detailed description on cloud computing, implementation of the teachings recited herein are not limited to a cloud-computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove. Thus, various implementations of the present invention may be deployed in a cloud computing environment.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 12.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to microcode, device drivers, redundant processing units, external disk drive arrays, RAID systems, tape drives, and data archival storage systems, etc.

Figure 2:
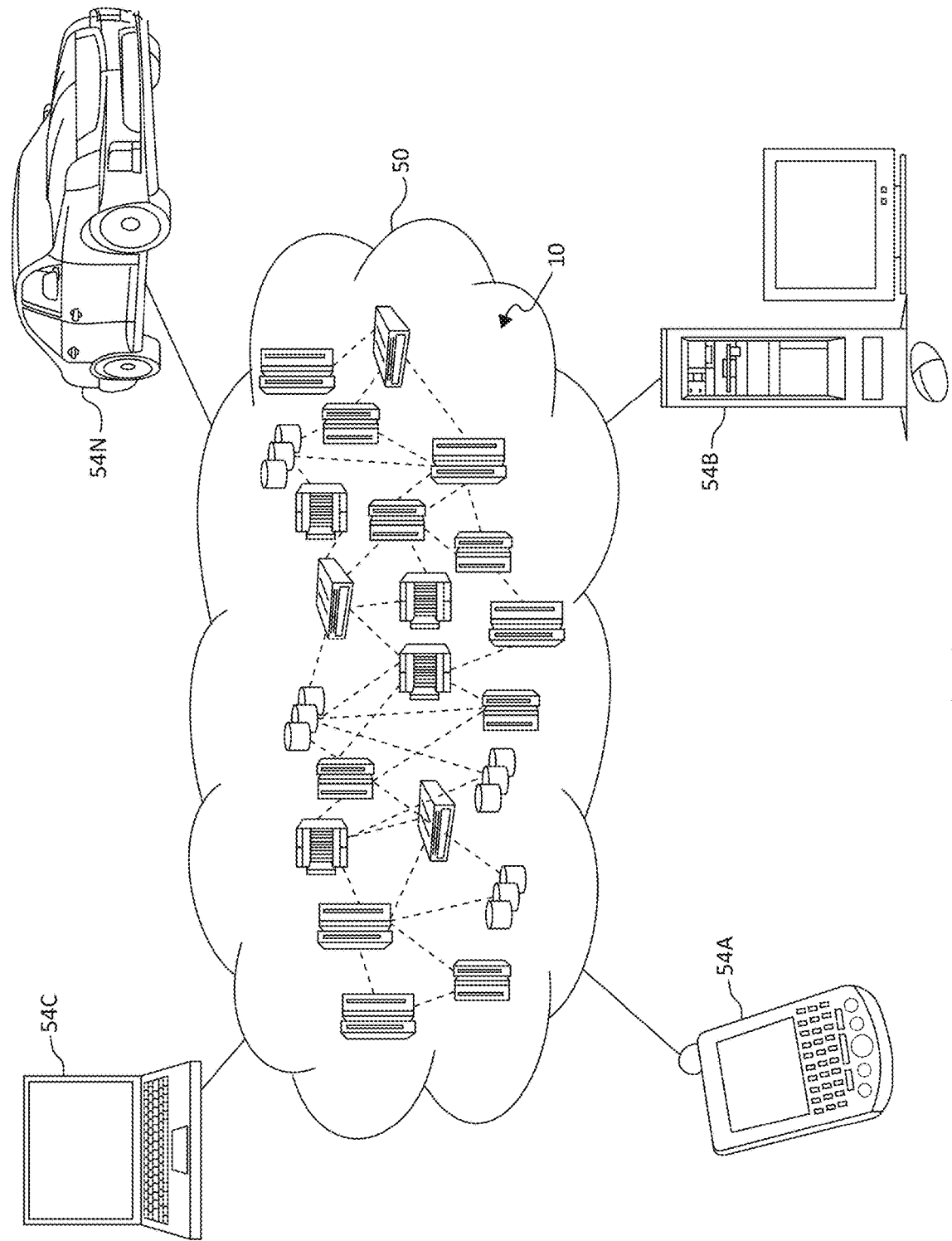
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
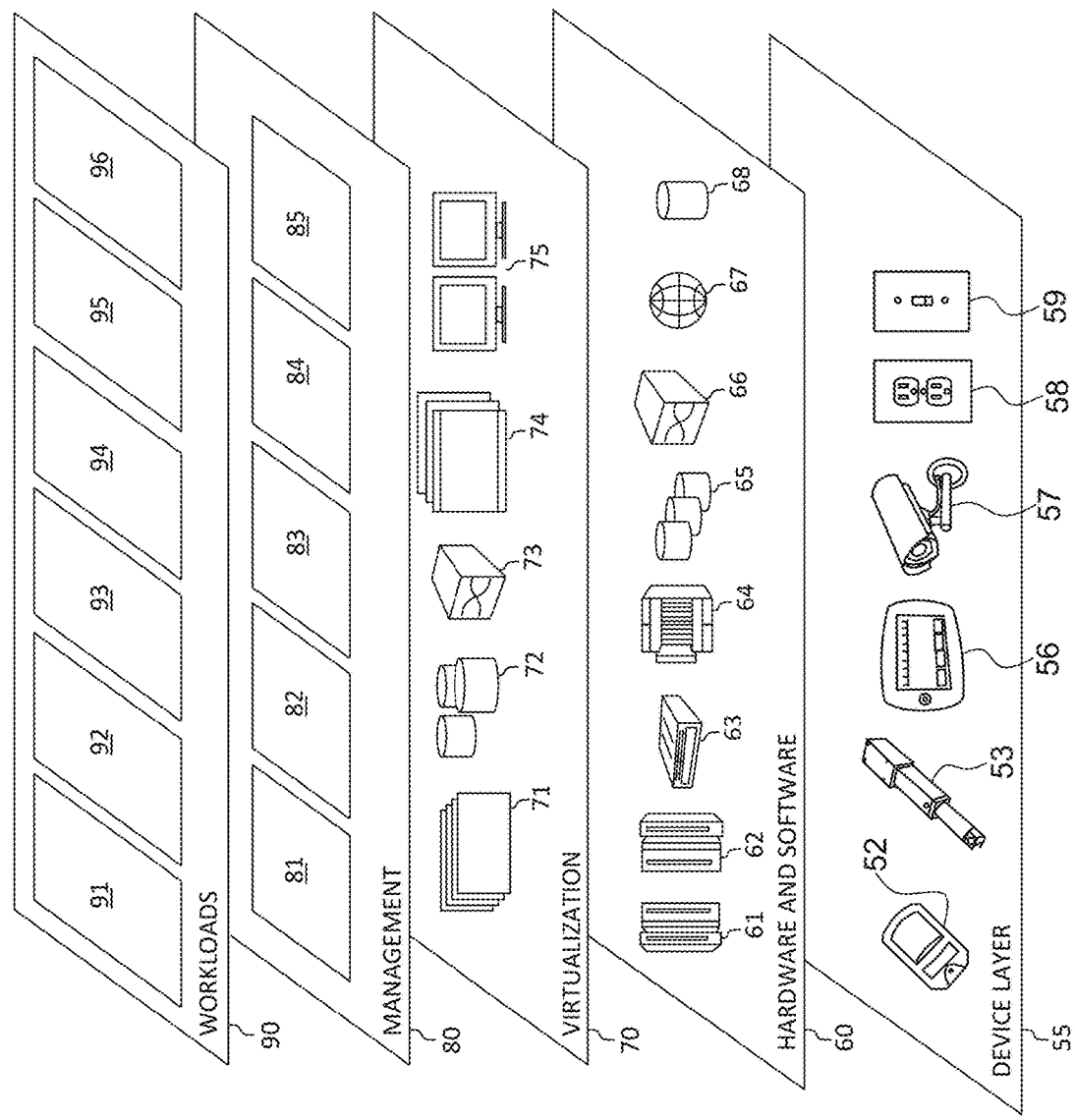
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote-control device), additional actuator devices, so called "smart" appliances such as a refrigerator or washer/dryer, and a wide variety of other possible interconnected objects.

Hardware and software layer 60 includes hardware and software components. Examples of hardware components include mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include mapping and navigation 91; software development and lifecycle management 92; virtual classroom education delivery 93; data analytics processing 94; transaction processing 95; and, in the context of the illustrated embodiments of the present invention, various workloads and functions 96 for providing an intelligent media data service. In addition, workloads and functions 96 for providing an intelligent media data service may include such operations as data analytics, data analysis, and as will be further described, notification functionality. One of ordinary skill in the art will appreciate that the workloads and functions 96 for providing an intelligent media data service may also work in conjunction with other portions of the various abstraction's layers, such as those in hardware and software 60, virtualization 70, management 80, and other workloads 90 (such as data analytics processing 94, for example) to accomplish the various purposes of the illustrated embodiments of the present invention.

Figure 4:
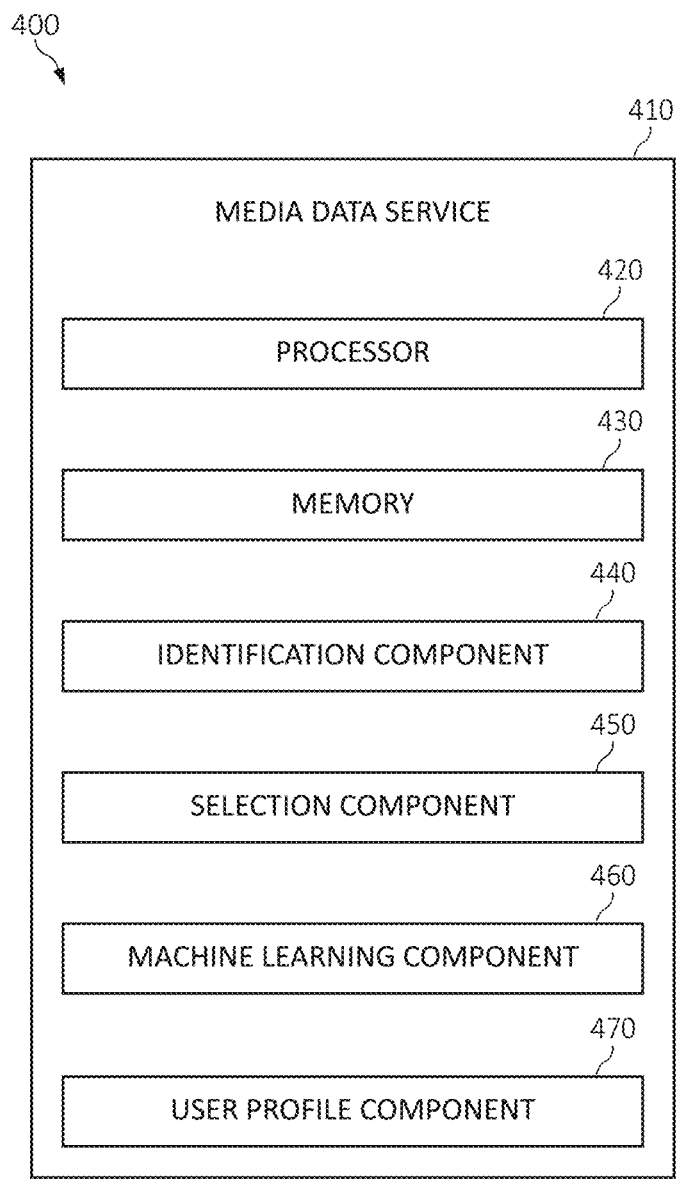
FIG. 4 is an additional block diagram depicting an exemplary functional relationship between various aspects of the present invention.

Turning now to FIG. 4, a block diagram depicting exemplary functional components of system 400 for providing an intelligent media data service (e.g., an intelligent audio recording explorer service) in a computing environment according to various mechanism of the illustrated embodiments is shown. In one aspect, one or more of the components, modules, services, applications, and/or functions described in FIGS. 1-3 may be used in FIG. 4. As will be seen, many of the functional blocks may also be considered "modules" or "components" of functionality, in the same descriptive sense as has been previously described in FIGS. 1-3.

Turning now to FIG. 4, a block diagram depicting exemplary functional components 400 for providing enhanced data anonymity protection according to various mechanisms of the illustrated embodiments, is shown. In one aspect, one or more of the components, modules, services, applications, and/or functions described in FIGS. 1-3 may be used in FIG. 4.

An intelligent media service 410 is shown, incorporating processing unit 420 to perform various computational, data processing, and other functionality in accordance with various aspects of the present disclosure. The processing unit 420 may be in communication with memory 430.

The intelligent media service 410 may include an identification component 440 (e.g., media data identification), a selection component 450, a machine learning component 460, and a user profile component 470. As one of ordinary skill in the art will appreciate, the depiction of the various functional units in intelligent media service 410 is for purposes of illustration, as the functional units may be located within an intelligent media service 410 or elsewhere within and/or between distributed computing components. It should be noted that the identification component 440 (e.g., media data identification), the selection component 450, the machine learning component 460, and the user profile component 470 may each work in concert with processing unit 420 and memory 430 to accomplish various aspects of the present disclosure.

The identification component 440 and the user profile component 470 may include a data repository or database (e.g., a database of audio and video recordings and data relating to a user profile of a user) accessible by the intelligent media service 410. The identification component 440 and the user profile component 470 may work in concert with processing unit 420 and memory 430 to accomplish various aspects of the present disclosure, such as, for example, enabling one or more datasets, fields of the datasets, or a cluster of datasets of one or more databases to be defined.

The intelligent media service, in conjunction with identification component 440 (e.g., media data identification), the selection component 450, the machine learning component 460, and/or the user profile component 470, may identify selected portions of data intended for use or play in a communication channel or device (e.g., an IoT device).

The intelligent media service, in conjunction with identification component 440 (e.g., media data identification), the selection component 450, the machine learning component 460, and/or the user profile component 470, may automatically identify and annotating one or more sections of media data for a user based on a degree of relevancy between a user profile and the media data, wherein the media data include media classification, topic detection, speaker detection and noise detection; and select the one or more sections of media data for the user based on the tagging of the or more sections.

The intelligent media service, in conjunction with identification component 440 (e.g., media data identification), the selection component 450, the machine learning component 460, and/or the user profile component 470, may learn and evaluate levels of satisfaction and behavior patterns of a user relating to the media classification, the topic detection, the speaker detection and the noise detection of the media data.

The intelligent media service, in conjunction with identification component 440 (e.g., media data identification), the selection component 450, the machine learning component 460, and/or the user profile component 470, may automatically identify sections of interest for the user based on the user profile, alternative user, and metadata.

The intelligent media service, in conjunction with identification component 440 (e.g., media data identification), the selection component 450, the machine learning component 460, and/or the user profile component 470, may identify behavior patterns and activities of the user based an interaction with the media data.

The intelligent media service, in conjunction with identification component 440 (e.g., media data identification), the selection component 450, the machine learning component 460, and/or the user profile component 470, may automatically bypass those portions of the media data identified as irrelevant to the user based on the degree of relevancy between the user profile and the media data.

The intelligent media service, in conjunction with identification component 440 (e.g., media data identification), the selection component 450, the machine learning component 460, and/or the user profile component 470, may collect feedback information from the user relating to the one or more sections of media data that are identified and tagged.

The intelligent media service, in conjunction with identification component 440 (e.g., media data identification), the selection component 450, the machine learning component 460, and/or the user profile component 470, may initialize a machine learning mechanism using the feedback information to learn levels of satisfaction and behavior patterns of the user profile and updating the user profile and identify one or more rules or policies for identifying and tagging the one or more sections of media data for the user.

The machine learning component 460 may learn the various behaviors, patterns, likes/dislikes pertaining to media data (e.g., audio recordings) to identify, detect, analyze, and/or interpret user profile data. In one aspect, the machine learning component 490 may include and/or access a knowledge domain that may include a variety of knowledge data such as, for example, data relating to the various types of music data for each type of user and/or entity.

In one aspect, the various machine learning operations of the machine learning component 460, as described herein, may be performed using a wide variety of methods or combinations of methods, such as supervised learning, unsupervised learning, temporal difference learning, reinforcement learning, and so forth. Some non-limiting examples of supervised learning which may be used with the present technology include AODE (averaged one-dependence estimators), artificial neural network, backpropagation, Bayesian statistics, naive bays classifier, Bayesian network, Bayesian knowledge base, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub-symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting examples of temporal difference learning may include Q-learning and learning automata. Specific details regarding any of the examples of supervised, unsupervised, temporal difference, or other machine learning described in this paragraph are known and are within the scope of this disclosure. Also, when deploying one or more machine learning models, a computing device may be first tested in a controlled environment before being deployed in a public setting. Also, even when deployed in a public environment (e.g., external to the controlled testing environment), the computing devices may be monitored for compliance.

Figure 5:
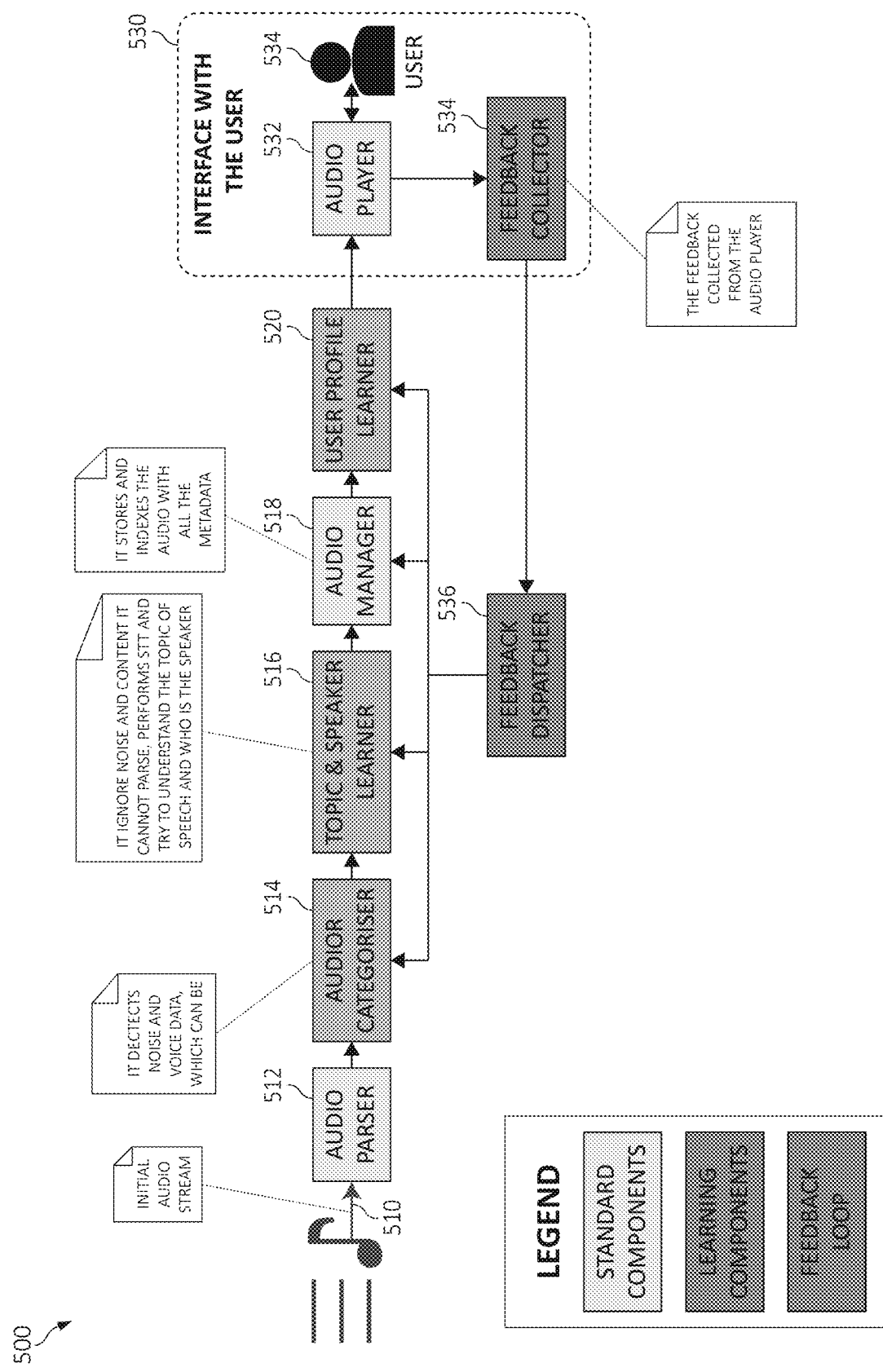
FIG. 5 is block flow diagram depicting an exemplary operations for providing an intelligent media data service in a computing environment according to an embodiment of the present invention.

For further explanation, FIG. 5 is block flow diagram depicting an exemplary operations 500 for providing an intelligent media data service in a computing environment in which aspects of the present disclosure may be realized. In one aspect, one or more of the components, modules, services, applications, and/or functions described in FIGS. 1-4 may be used in FIG. 5. Repetitive description of like elements, components, modules, services, applications, and/or functions employed in other embodiments described herein is omitted for the sake of brevity.

As depicted, an initial audio stream 510 is provided to an audio parser 512. The audio file may be passed and sent to an audio categorizer 514. The audio categorizer 514 may detect noise and voice data, which can be analyzed. A topic and speaker learner 516 may be activated to ignore the noise and content that is unable to be parsed. The topic and speaker learner 516 may also perform a speech-to-text ("STT") operation and attempt to learn and understand a topic of a portion of the media data (e.g., speech data) of a speaker of the media data.

An audio manager 518 may store and index all media data (e.g., the audio data) with all metadata. A user profile learner 520 may be used to learn data, behavior patterns, likes/dislikes, activities of daily living and other information of a user. A user interface ("UI") component 530 may be provided. The UI 530 may include an audio player 532 that plays/displays the audio data to a user 534. A feedback collector 534 may collect data from the user 534 and provide the feedback data to a feedback dispatcher 536, which may in turn deliver the feedback data back to the audio categorizer 514, the topic and speaker learner 516, the audio manager 518, and the user profile learner 520. In this way, the present invention provides for automatically identifying sections of an audio recording with multiple speakers using the various components individually or collective of FIG. 5.

Figure 6:
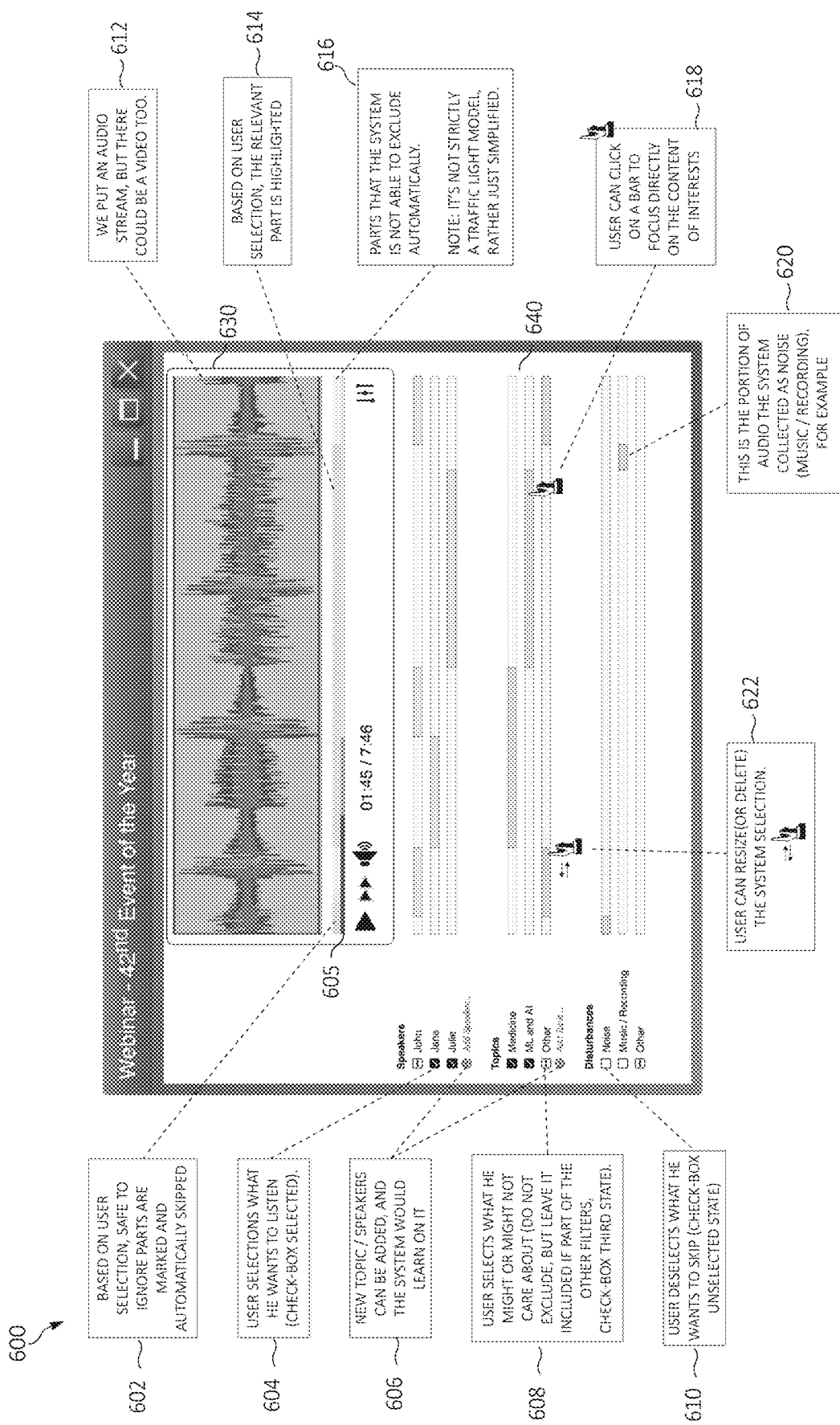
FIG. 6 is a diagram depicting a user interface displaying results from providing an intelligent media data service in a computing environment according to an embodiment of the present invention.

For further example, FIG. 6 is a diagram depicting a user interface 600 displaying results from providing an intelligent media data service in a computing environment according to an embodiment of the present invention. In some implementations, each of the devices, components, modules, operations, and/or functions described in FIGS. 1-5 also may apply or perform one or more operations or actions of FIG. 6. The functionality 600 may be implemented as a method executed as instructions on a machine, where the instructions are included on at least one computer readable medium or one non-transitory machine-readable storage medium.

As depicted, the user interface 600 includes a timeline 605 highlighting relevant content for a user, a player 620 (e.g., a classic player for displaying and playing media data) and learned sections 630. In operation, the present invention may perform a variety of operations and actions in the user interface 600. For example, the present invention may, based on user selection, selectively skip, bypass, and ignore section of the audio data that are marked and automatically skipped, as in block 602. A user selection may select what to listen to and select one or more interactive selection features such as, for example, knobs, buttons, or check boxes to listen to the audio data, as in block 604.

A new, different, or alternative topic/speakers can be added to the user interface 600 and the present invention may interpret, learn, and evaluate this activity, as in block 606. A user selects what the user may or may not care about (e.g., a check box that indicates do not exclude, but leave it included if part of the other filters, etc.), as in block 608. A user may deselect what the user wants to skip, bypass, or ignore, as in block 610.

In some implementations, the present invention may place/put a media stream (e.g., an audio stream) in the player 620 (block 612), and selected parts of a video may also be displayed and highlighted, as in block 614. The user may select (e.g., click) on this highlighted portion to jump directly to such content of interest (block 618), and resize or delete the selection, as in block 622. Also, the present invention may depict those parts a system is unable to automatically exclude, as in block 616. This is the portion of audio the system collected as noise such as, for example, music, recording, as in block 620. It should be noted that each of the actions, operations, and steps indicating each block are depicted by way of example only and may be performed in order or in any combination of order.

Figure 7:
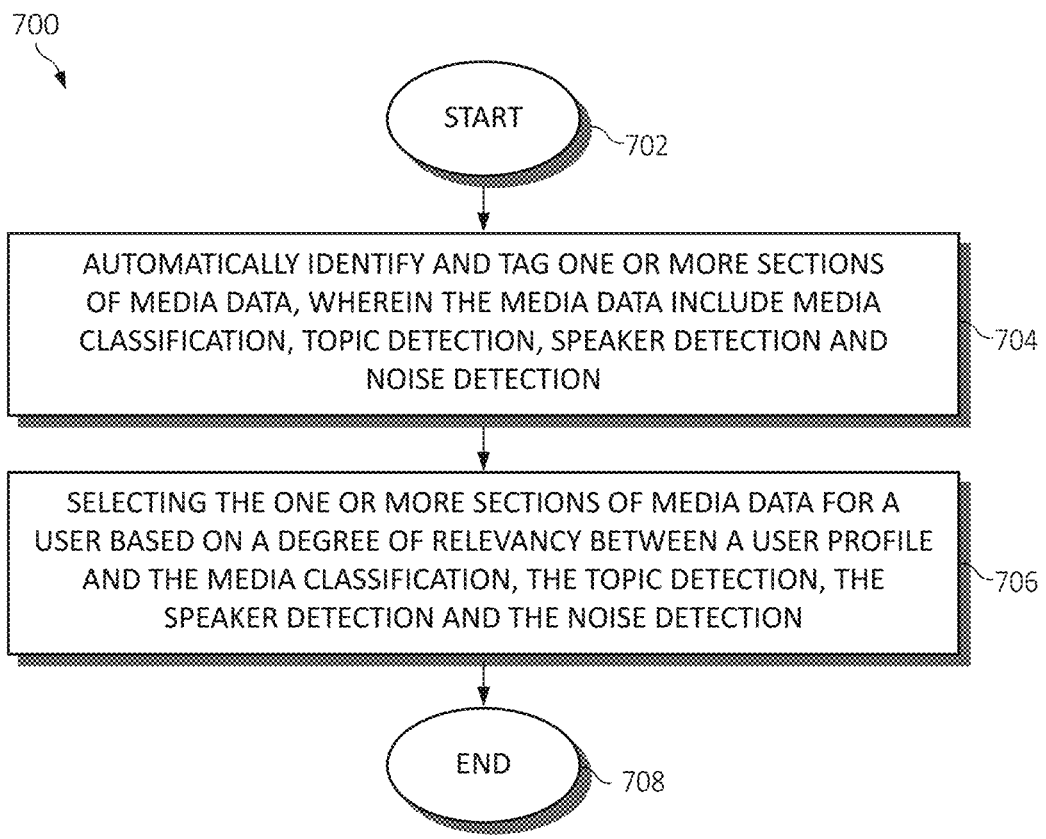
FIG. 7 is a flowchart diagram depicting an additional exemplary method for providing an intelligent media data service in a computing environment according to an embodiment of the present invention.

FIG. 7 is a flowchart diagram depicting an exemplary method for providing an intelligent media data service in a computing environment. In one aspect, each of the devices, components, modules, operations, and/or functions described in FIGS. 1-6 also may apply or perform one or more operations or actions of FIG. 7. The functionality 700 may be implemented as a method executed as instructions on a machine, where the instructions are included on at least one computer readable medium or one non-transitory machine-readable storage medium. The functionality 700 may start in block 702.

One or more sections of media data are identified and annotated (e.g., tagged) for a user based on a degree of relevancy between a user profile and the media data, where the media data include media classification, topic detection, speaker detection and noise detection, as in block 704. The one or more sections of media data are selected for the user based on the tagging of the or more sections, as in block 706. In one aspect, the functionality 700 may end, as in block 708.

In one aspect, in conjunction with and/or as part of at least one block of FIG. 7, the operations of method 700 may include each of the following. The operations of method 700 may learn and evaluate levels of satisfaction and behavior patterns of a user relating to the media classification, the topic detection, the speaker detection and the noise detection of the media data. The operations of method 700 may automatically identify sections of interest for the user based on the user profile, alternative user, and metadata.

The operations of method 700 may identify behavior patterns and activities of the user based an interaction with the media data. The operations of method 700 may automatically bypass those portions of the media data identified as irrelevant to the user based on the degree of relevancy between the user profile and the media data. The operations of method 700 may collect feedback information from the user relating to the one or more sections of media data that are identified and tagged.

The operations of method 700 may initialize a machine learning mechanism using the feedback information to learn levels of satisfaction and behavior patterns of the user profile and updating the user profile and identify one or more rules or policies for identifying and tagging the one or more sections of media data for the user.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method, by a processor, for providing an intelligent media data service in a computing environment, comprising:
   automatically identifying and tagging one or more sections of media data for a user based on a degree of relevancy between a user profile and the media data, wherein the identifying and tagging of the media data includes performing analysis operations comprising media classification, topic detection, speaker detection and noise detection; and
   selecting the one or more sections of media data for the user based on the tagging of the one or more sections, wherein the selecting of the one or more sections includes receiving input from the user selecting one or more topics, speakers, and noise disturbances, identified by the analysis operations, to respectively include and exclude in an emphasized appearance within a graphical representation of the media data.

2. The method of claim 1, further including learning and evaluating levels of satisfaction and behavior patterns of a user relating to the media classification, the topic detection, the speaker detection and the noise detection of the media data.

3. The method of claim 1, further including automatically identifying sections of interest of the media data for the user based on information associated with one or more alternative users, metadata of the media data, and the user profile.

4. The method of claim 1, further including identifying behavior patterns and activities of the user based an interaction with the media data.

5. The method of claim 1, further including:
   identifying portions of the media data as irrelevant to the user based on the degree of relevancy between the user profile and the media data; and
   automatically bypassing those portions of the media data identified as irrelevant to the user.

6. The method of claim 1, further including collecting feedback information from the user relating to the one or more sections of media data that are identified and tagged.

7. The method of claim 6, further including initializing a machine learning mechanism using the feedback information to learn levels of satisfaction and behavior patterns of the user profile and updating the user profile and identify one or more rules or policies for identifying and tagging the one or more sections of media data for the user.

8. A system for providing an intelligent media data service in a computing environment, comprising:
   one or more computers with executable instructions that when executed cause the system to:
      automatically identify and tag one or more sections of media data for a user based on a degree of relevancy between a user profile and the media data, wherein the identifying and tagging of the media data includes performing analysis operations comprising media classification, topic detection, speaker detection and noise detection; and
   select the one or more sections of media data for the user based on the tagging of the one or more sections, wherein the selecting of the one or more sections includes receiving input from the user selecting one or more topics, speakers, and noise disturbances, identified by the analysis operations, to respectively include and exclude in an emphasized appearance within a graphical representation of the media data.

9. The system of claim 8, wherein the executable instructions that when executed cause the system to learn and evaluate levels of satisfaction and behavior patterns of a user relating to the media classification, the topic detection, the speaker detection and the noise detection of the media data.

10. The system of claim 8, wherein the executable instructions that when executed cause the system to automatically identify sections of interest of the media data for the user based on information associated with one or more alternative users, metadata of the media data, and the user profile.

11. The system of claim 8, wherein the executable instructions that when executed cause the system to identify behavior patterns and activities of the user based an interaction with the media data.

12. The system of claim 8, wherein the executable instructions that when executed cause the system to:
   identify portions of the media data as irrelevant to the user based on the degree of relevancy between the user profile and the media data; and
   automatically bypass those portions of the media data identified as irrelevant to the user.

13. The system of claim 8, wherein the executable instructions that when executed cause the system to collect feedback information from the user relating to the one or more sections of media data that are identified and tagged.

14. The system of claim 13, wherein the executable instructions that when executed cause the system to initialize a machine learning mechanism using the feedback information to learn levels of satisfaction and behavior patterns of the user profile and updating the user profile and identify one or more rules or policies for identifying and tagging the one or more sections of media data for the user.

15. A computer program product for providing an intelligent media data service in a computing environment, the computer program product comprising:

one or more computer readable storage media, and program instructions collectively stored on the one or more computer readable storage media, the program instruction comprising:

program instructions to automatically identify and tag one or more sections of media data for a user based on a degree of relevancy between a user profile and the media data, wherein the identifying and tagging of the media data includes performing analysis operations comprising media classification, topic detection, speaker detection and noise detection; and program instructions to select the one or more sections of media data for the user based on the tagging of the one or more sections, wherein the selecting of the one or more sections includes receiving input from the user selecting one or more topics, speakers, and noise disturbances, identified by the analysis operations, to respectively include and exclude in an emphasized appearance within a graphical representation of the media data.

16. The computer program product of claim 15, further including program instructions to learn and evaluate levels of satisfaction and behavior patterns of a user relating to the media classification, the topic detection, the speaker detection and the noise detection of the media data.

17. The computer program product of claim 15, further including program instructions to:

automatically identify sections of interest of the media data for the user based on information associated with one or more alternative users, metadata of the media data, and the user profile; and identify behavior patterns and activities of the user based an interaction with the media data.

18. The computer program product of claim 15, further including program instructions to:

identify portions of the media data as irrelevant to the user based on the degree of relevancy between the user profile and the media data; and automatically bypass those portions of the media data identified as irrelevant to the user.

19. The computer program product of claim 15, further including program instructions to collect feedback information from the user relating to the one or more sections of media data that are identified and tagged.

20. The computer program product of claim 19, further including program instructions to initialize a machine learning mechanism using the feedback information to learn levels of satisfaction and behavior patterns of the user profile and updating the user profile and identify one or more rules or policies for identifying and tagging the one or more sections of media data for the user.

* * * * *